United States Patent [19]

Van Hout et al.

[11] Patent Number: 5,030,864
[45] Date of Patent: Jul. 9, 1991

[54] THREE-PHASE ELECTRICAL MACHINE WITH REDUCED COGGING TORQUE

[75] Inventors: Henricus M. Van Hout, Eindhoven; Jan Janson, Leende; Johannes H. H. Janssen, St. Oedenrode; Robertus I. Van Steen, Eindhoven, all of Netherlands

[73] Assignee: U. S. Philips Corporation, New York, N.Y.

[21] Appl. No.: 403,555

[22] Filed: Sep. 6, 1989

Related U.S. Application Data

[63] Continuation-in-part of Ser. No. 318,222, Mar. 2, 1989, abandoned.

[30] Foreign Application Priority Data

Jul. 5, 1988 [NL] Netherlands ............... 8801700

[51] Int. Cl.⁵ ............ H02K 11/00; H02K 37/06; H02K 5/24; H02K 1/16
[52] U.S. Cl. ............... 310/67 R; 310/49 R; 310/51; 310/156; 310/268; 310/179
[58] Field of Search ............ 310/49 R, 51, 67 R, 310/156, 179, 180, 181, 184, 185, 187, 269

[56] References Cited

U.S. PATENT DOCUMENTS

| | | | |
|---|---|---|---|
| 3,860,843 | 1/1975 | Kawasaki et al. | 310/67 R |
| 4,280,072 | 7/1981 | Gotou et al. | 310/156 |
| 4,626,727 | 12/1986 | Janson | 310/156 |
| 4,730,136 | 3/1988 | Müller | 310/67 R |

Primary Examiner—Steven L. Stephan
Assistant Examiner—C. LaBalle

[57] ABSTRACT

An electrical multipole machine comprises a first machine section (1), a second machine section (3) and a machine shaft (5), about which one machine section is rotatable relative to the other machine section. The first machine section comprises an annular permanent-magnet body (11) having a plurality of adjacent pole pairs (N; S). The second machine section comprises a lamination assembly (25) having teeth (27-35) and coils (37-45). The teeth comprise tooth surfaces (47-55) which are geometrically spaced from one another by slots (57-65) and from the magnet body by an air gap (67). Near the air gap the slots extend in a tangential direction over at least 80 electrical degrees and at the most 90 electrical degrees, or over at least 130 electrical degrees and at the most 150 electrical degrees. The ratio between the number of poles and the number of teeth is either 4:3 or 2:3.

6 Claims, 5 Drawing Sheets

THREE-PHASE ELECTRICAL MACHINE WITH REDUCED COGGING TORQUE

CROSS REFERENCE TO RELATED APPLICATIONS:

This application is a continuation-in-part of U.S. Ser. No. 07/318,222, filed Mar. 2, 1989 now abandoned.

BACKGROUND OF THE INVENTION

The invention relates to a three-phase electrical machine, in particular a d.c. motor, comprising a first machine section which comprises an annular permanent-magnet body having a plurality of adjacent pole pairs, each comprising a north pole and a south pole, a second machine section which comprises a soft-magnetic body and at least one coil, in which body slots are formed to define teeth, which each have a tooth surface for cooperation with said poles via an air gap, the tooth surfaces having equal tangential dimensions, and a machine shaft about which one machine section is rotatable relative to the other machine section.

Such a machine in the form of a d.c. motor is known from U.S. Pat. No. 4,626,727 (herewith incorporated by reference), An embodiment of the prior-art motor comprises a stator formed by a star-shaped lamination assembly having six radial limbs which terminate in stator-tooth surfaces disposed on an imaginary cylindrical surface. The limbs carry coils. The rotor comprises a shaft carrying a disc-shaped body which changes into a cylindrical portion surrounding the stator and provided with an annular or cylindrical magnet on its inner side. The magnet, which is radially magnetised, has eight poles and cooperates with the stator tooth surfaces. Another embodiment of the prior-art motor comprises a stator having a star-shaped lamination assembly with radial limbs having axial end faces, which are used as stator tooth surfaces. The rotor in this embodiment is provided with a disc-shaped rotor support carrying an annular rotor magnet. The rotor magnet is axially magnetised and cooperates with the stator-tooth surfaces via an axial air gap. In this embodiment and in said other embodiment the ratio between the number of poles and the number of tooth surfaces is 4:3. In the known d.c. motor the pole pairs, which each comprise a north pole and a south pole, each extend tangentially over 360 electrical degrees. In this respect it is to be noted, that it is alternatively possible to provide a small gap between the successive pole pairs, so that each pole extends over less than 180 electrical degrees in a tangential direction. Indeed, German Offenlegungsschrift 31.22.049 (herewith incorporated by reference) also describes such a proposal.

A drawback of the known three-phase d.c. machine is the occurrence of detent torques. A detent torque arises because the overall magnetic energy varies when the pattern of the slots between the tooth surfaces and the pattern of north and south poles move relative to one another. As is known, the detent torque frequencies, expressed in the number of periods per revolution, correspond to the lowest common multiple of the poles and the teeth and to multiples thereof if the rotor and the stator of the d.c. machine are perfectly symmetrical. The frequency corresponding to the lowest common multiple is called the fundamental frequency; the frequencies corresponding to multiples thereof are referred to as harmonics. For uses where stringent requirements are imposed on a uniform operation of the rotor, for example in audio and video equipment, the occurrence of detent torques is undesirable. The fundamental frequency has the greatest influence on the occurrence of speed variations and is therefore most annoying.

A known method of eliminating detent torques is to make the pole separations between the poles inclined (skewing). A drawback of this step is that a certain loss of magnetic flux occurs and hence a loss of efficiency. Moreover, such pole separations may give rise to forces in undesired directions in specific motor constructions, which may produce noise. It is also known to provide narrow slots in conjunction with said skewing of the pole separations in order to reduce the effect the detent torque. However, narrow slots constitute a substantial drawback in the production of the motor, in particular in mounting the coils.

It is an object of the invention to modify the electrical machine defined in the opening paragraph in such a way that the fundamental frequency of the detent torque is wholly or almost wholly eliminated without the necessity of skewing the pole separations in the permanent-magnet body.

SUMMARY OF THE INVENTION

To this end the electrical machine in accordance with the invention, in which the ratio between the number of poles and the number of teeth is either 4:3 or 2:3 and which is preferably commutated electronically, is characterized in that near the air gap the slots extend over at least 80 electrical degrees and at the most 90 electrical degrees or over at least 130 electrical degrees and at the most 150 electrical degrees in a tangential direction. Experiments have shown that for a specific slot dimension within the above specificed limits the fundamental frequency of the detent torque can be minimised. The above limits correspond to comparatively wide slots viewed in the circumferential direction of the motor. Measurements show that, in contradistinction to what might be expected, the fundamental frequency of the voltage induce in the coils hardly differs from the fundamental frequency of the voltage induced in the coils of the known d.c. motors having a substantially smaller slot width.

Many d.c. motors, in particular motors of smaller dimensions, comprise 4, 8 or 12 poles and 3, 6 or 9 teeth respectively, or they comprise 2 or 6 poles and 3 and 9 teeth respectively. Such d.c. motors yield optimum results in respect of suppression of the detent torque, if the electrical machine is characterized in that near the air gap the slots extend over at least substantially 88 electrical degrees in a tangential direction, or in that near the air gap the slots extend over at least substantially 145 electrical degrees, a spread of substantially 2 electrical degrees in said values being possible depending on the motor construction. With respect to the output power such an embodiment of the invention preferably comprises pole pairs, which each extend over 360 electrical degrees in a tangential direction.

European Patent Application No. 0,223,093 describes a single phase brushless d.c. motor which comprises a rotor magnet having six rotor poles and a stator which cooperates with said rotor and which has four stator poles, each of the poles having an angular width of 60°. DE 220 8854 describes a two-phase synchronous motor which comprises ten rotor poles and eight stator teeth and which; if constructed as a stepping motor, can per-form steps of 18°. Although both motors known from the above-mentioned patent publications exhibit detent-torque problems, the problem of detent torques in such motors is basically different from the problem encountered in three-phase d.c. machines of the type to which the invention relates.

BRIEF DESCRIPTION OF THE DRAWINGS

The invention will now be described in more detail, by way of example, with reference to the accompanying drawings, in which.

DETAILED DESCRIPTION OF THE INVENTION

Figure 1:
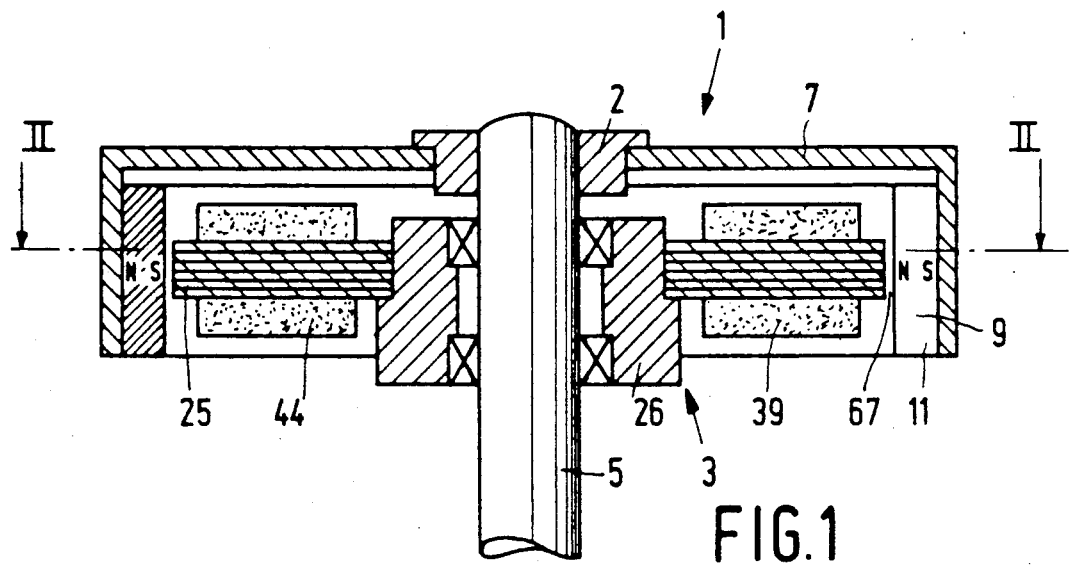
FIG. 1 shows a first embodiment of the electrical machine in accordance with the invention in a longitudinal sectional view taken on the line I—I in FIG. 2.
Figure 2:
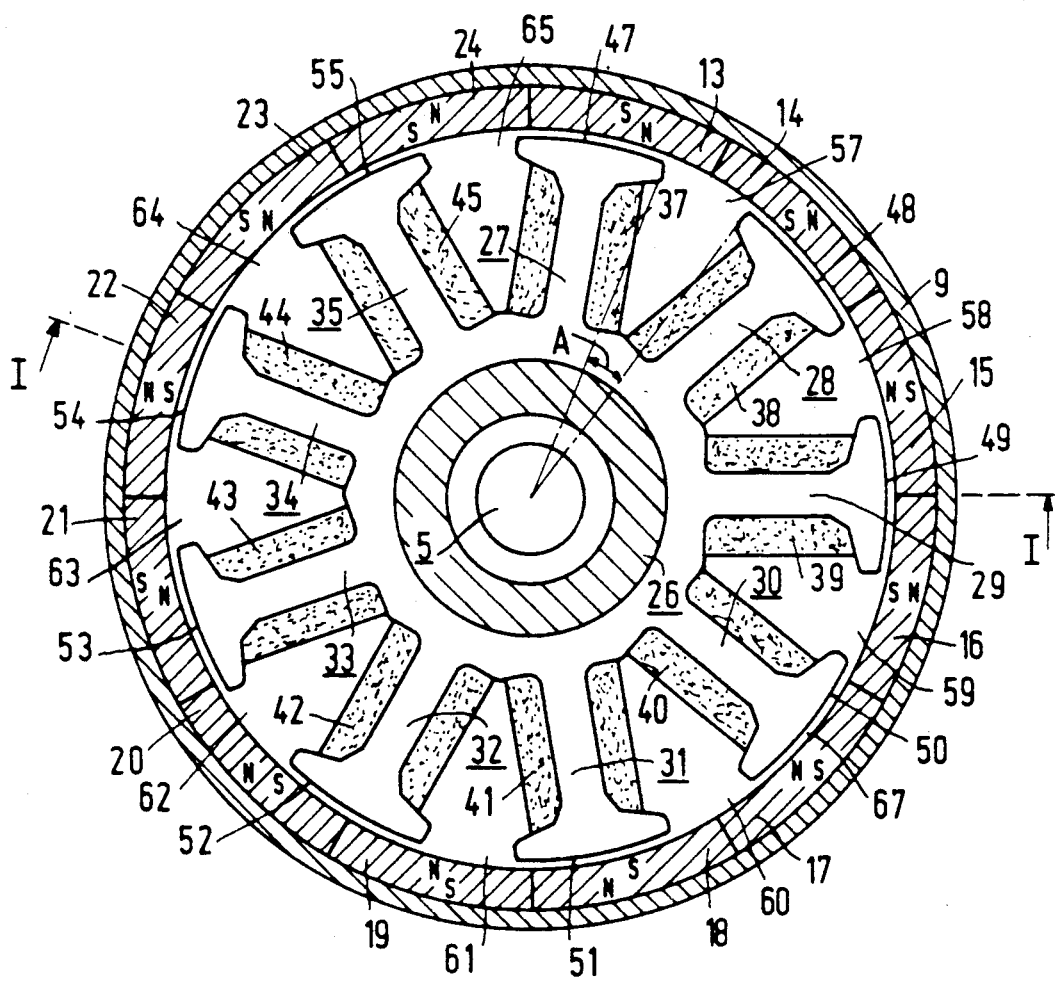
FIG. 2 is a cross-sectional view taken on the line II—II in FIG. 1.

The embodiment shown in FIGS. 1 and 2 comprises a first machine section constructed as a rotor, referred to hereinafter as the rotor 1, and a second machine section 3 functioning as a stator, and referred to hereinafter as the stator 3. The rotor 1, which by means of a coupling member 2 is secured to the motor shaft 5, which is journalled in the stator 3, is provided with a soft-magnetic body, for example made of sheet iron and comprising a disc-shaped portion 7 and a cylindrical portion 9 which is coaxial with the motor shaft 5. On the inner side of the cylindrical portion 9 an annular permanent-magnet body 11 is mounted. It is to be noted that the term annular is to be understood to mean also cylindrical. The magnet body 11 is radially magnetised and comprises 12 poles 13 to 24 having alternately opposite polarities. In the drawings the poles are indicated by the letters N (north poles) and S (south poles). The body 11, which may be constructed as one-piece ring, for example of a resin-bonded ferrite, has distinct pole separations in order to ensure that the poles each extend over 180 electrical degrees in the circumferential direction. The pole separations extend parallel to the motor shaft 5.

The stator 3 comprises a laminated soft-magnetic body 25, referred to as lamination assembly, which is secured to a central stator section 26 and which comprises 9 stator teeth, or briefly teeth, 27 to 35 around which coils 37 to 45 are wound. The radially extending teeth 27 to 35 terminate in tooth surfaces 47 to 55, which are disposed on an imaginary cylindrical surface which is coaxial with the motor shaft, which surfaces are spaced from each other by slots 57 to 65 and which in operation cooperate with poles 13 to 24 via a narrow cylindrical air gap 67. In the present example the slots between the tooth surfaces extend over 88 electrical degrees in a tangential direction, which corresponds to a central angle A of 88/6 geometrical degrees.

Figure 3:
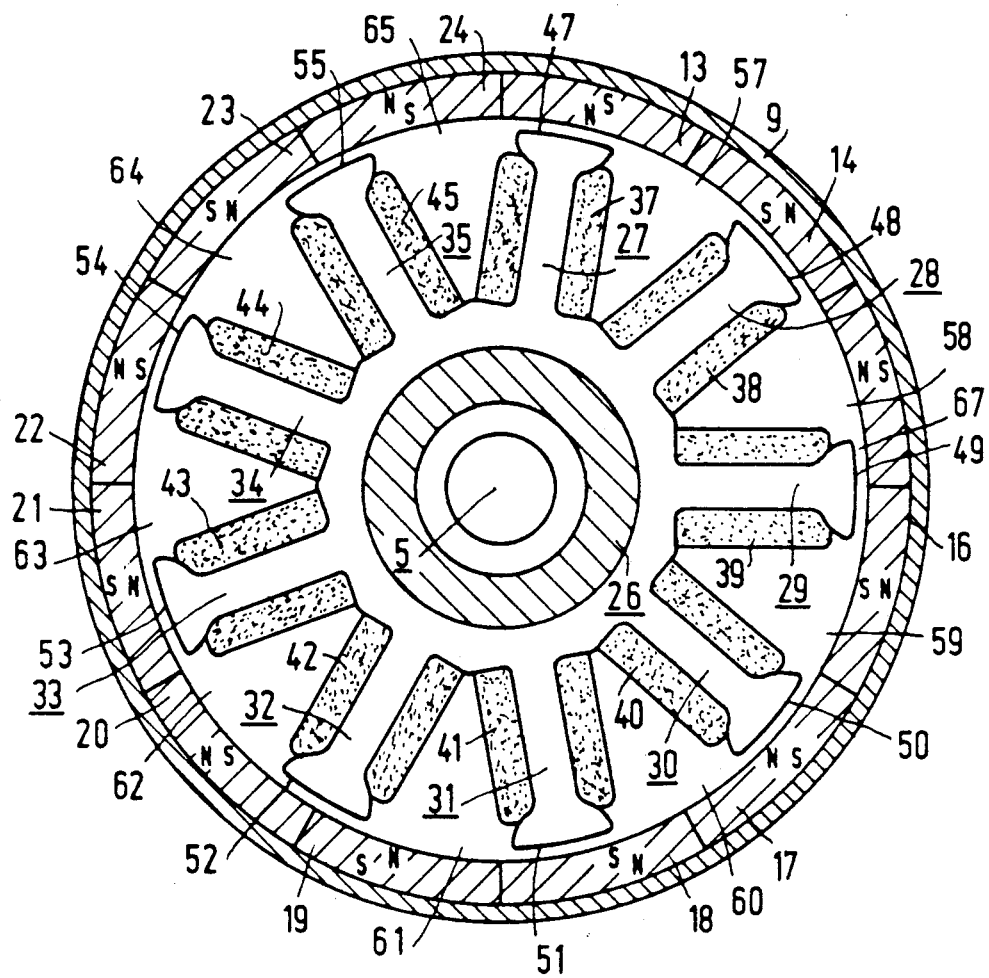
FIG. 3 is a cross-sectional view of a second embodiment.

The embodiment shown in FIG. 3 is of identical construction as the embodiment described in the foregoing but exhibits larger tangential slot dimensions. Since the two embodiments are closely related corresponding parts of the two embodiments bear the same reference numerals. The slots 57 to 65 in the embodiment shown in FIG. 3 have a width, measured between the tooth surfaces 47 to 55 and near the air gap 67, which is related to 145 electrical degrees.

Surprisingly it is found that the embodiments of the d.c. motor in accordance with the invention described herein hardly suffer from the adverse effect of the fundamental frequency of the detent torque, whereas the surface area of the tooth surfaces 47 to 55 is still adequate to effectively link the magnetic flux issuing from the magnet body 11, so that the d.c. motor has both a highly constant speed of rotation and a high efficiency.

Figure 7:
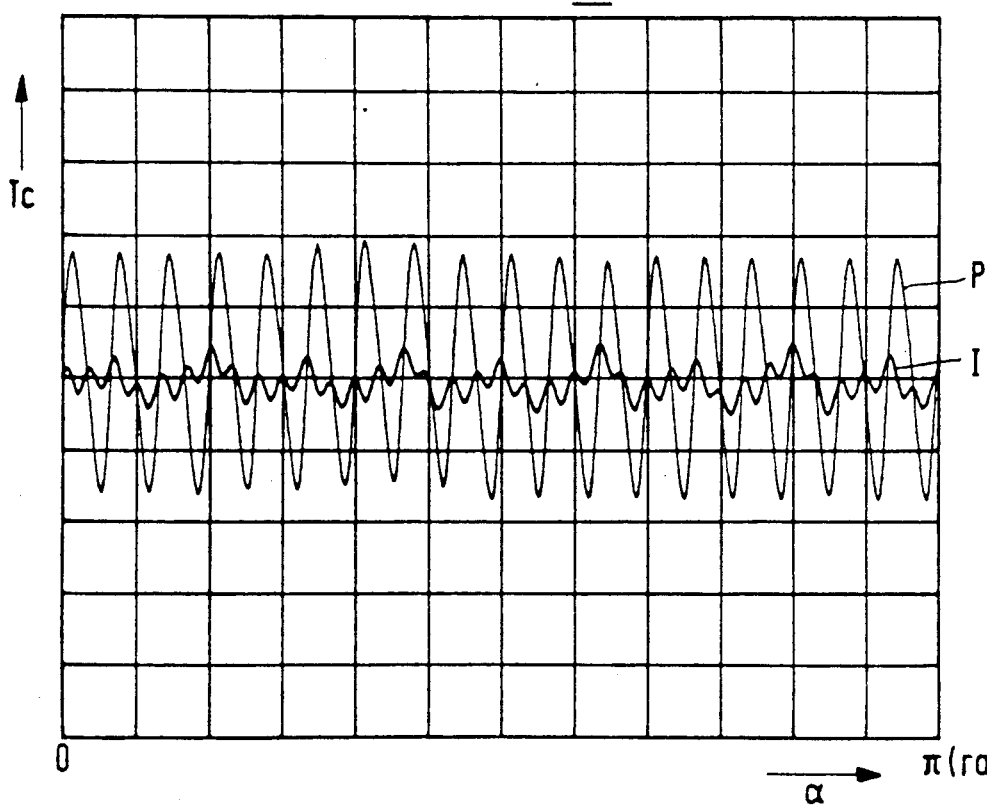
FIG. 7 is a graph representing the detent torque as a function of the rotor position for the embodiment shown in FIG. 1 and for a known d.c. motor of the same dimensions, having 9 teeth and 12 poles.

In order to illustrate the difference between the detent torque of the first embodiment described herein and the detent torque of a corresponding prior-art d.c. motor, FIG. 7 gives a diagram representing measurement values for both motors. The angle of rotation α of the rotor is plotted along the horizontal axis of the diagram and the magnitude of the measured detent torques are plotted along the vertical axis, the scale adopted for both measurements being obviously the same. The letter I indicates the characteristic of the detent torque of the d.c. motor in accordance with the invention and the letter P denotes the characteristic of the detent torque of the prior-art d.c. motor for half a revolution of the rotor. As will be apparent from the diagram, the amplitude of the detent torque of the d.c. motor in accordance with the invention is substantially smaller and hence more favourable than the amplitude of the detent torque of the prior-art motor. The diagram also shows that the detent torque frequency of the motor in accordance with the invention is at least substantially equal to twice the frequency of the detent torque of the prior-art motor, which indicates that the fundamental frequency of the detent torque of the motor in accordance with the invention is eliminated almost completely.

Figure 4:
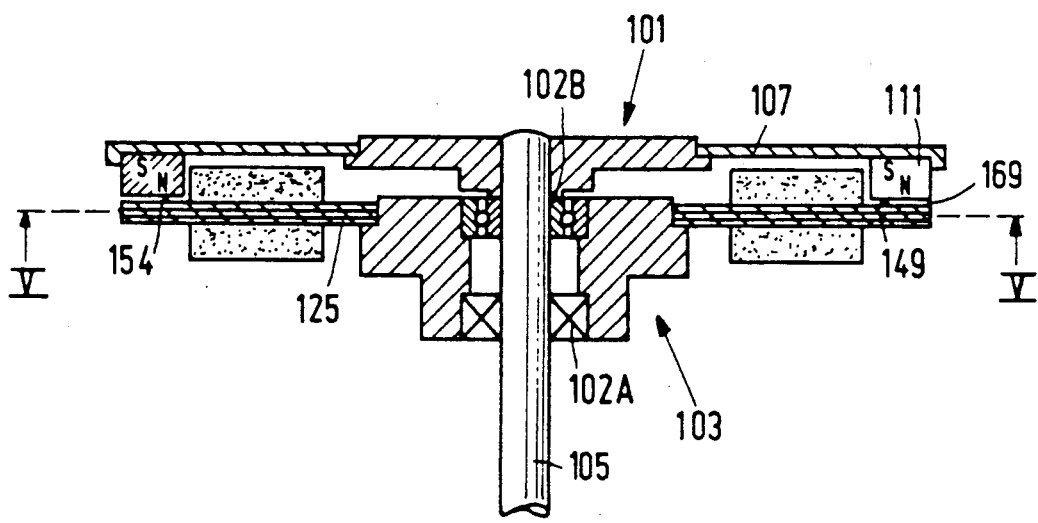
FIG. 4 shows a third embodiment in a longitudinal sectional view taken on the line IV—IV in FIG. 5.
Figure 5:
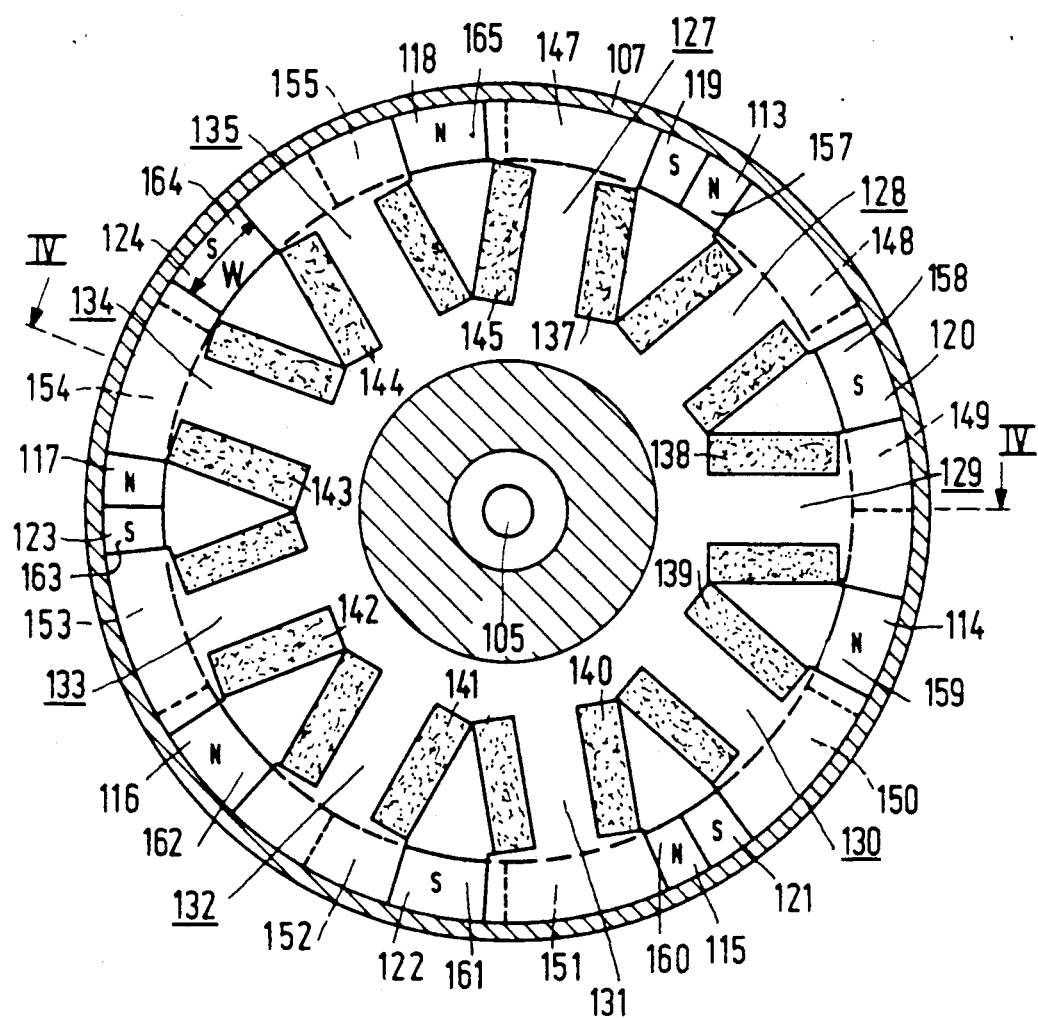
FIG. 5 is a cross-sectional view taken on the line V—V in FIG. 4.

The third embodiment shown in FIGS. 4 and 5 is in principle identical to the embodiments described in the foregoing with respect to its operation and the favourable effects achieved. There are only differences in respect of the motor construction. The embodiment shown in FIGS. 4 and 5 comprises a rotor 101 with a motor shaft 105 which is rotatably journalled in the stator 103 by means of bearings 102a and 102b, and a disc-shaped body 107 to which an annular axially magnetised magnet body 111 is secured. The magnet body 111 comprises 6 north poles (N) 113 to 118 and 6 south poles (S) 119 to 124. The stator 103 comprises a star-shaped soft-magnetic body 125 comprising 9 teeth 127 to 135 and comprising 9 coils 137 to 145 arranged around the teeth. At their sides which face the magnet body 111 the teeth have tooth surfaces 147 to 155 disposed in the same plane to cooperate with the poles 113 to 124 via a narrow axial air gap 167. Between the tooth surfaces 147 to 155 slots 157 to 165 are formed, which have a dimension W corresponding to 87 electrical degrees in a tangential direction.

Figure 6:
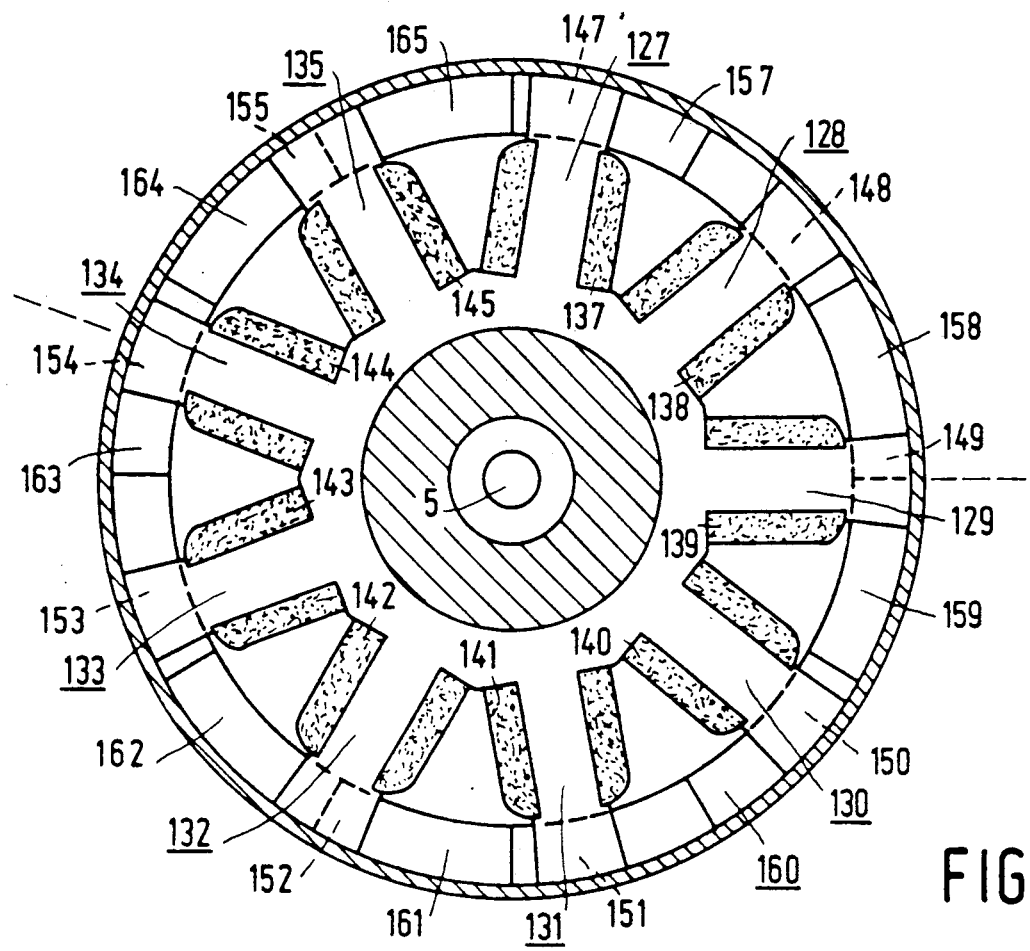
FIG. 6 is a cross-sectional view of a fourth embodiment.

The fourth embodiment shown in FIG. 6 differs from the preceding embodiment only in that the tooth surfaces 147 to 155 are narrower. The slots 157 to 165 between the tooth surfaces 147 to 155 extend tangentially over 145 electrical degrees.

Figure 8:
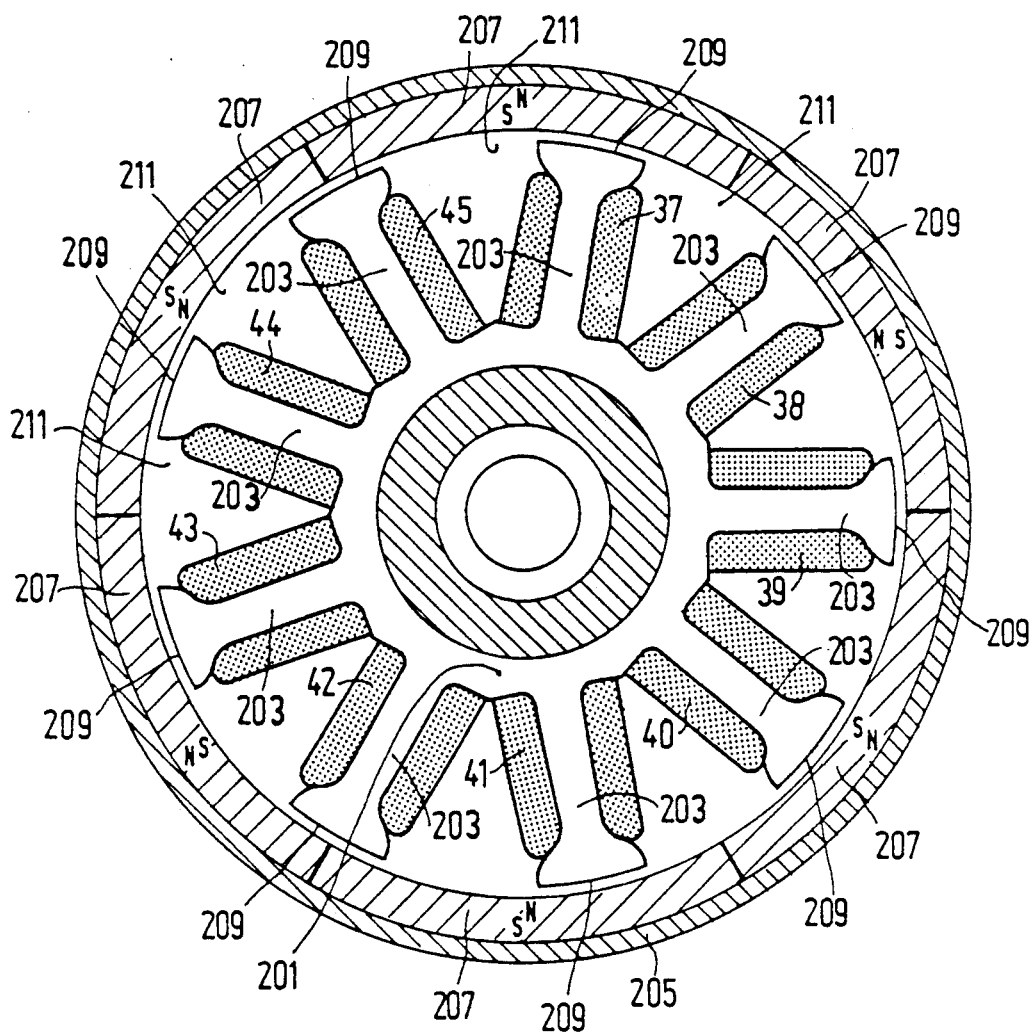
FIG. 8 is a cross-sectional view of a fifth embodiment.

FIG. 8 shows an embodiment of the electrical machine in accordance with the invention, comprising a stator 201 having nine stator teeth 203 and a rotor 205 having six magnetic poles 207. The teeth 203 each exhibit a tooth surface 209 which extend tangentially over 11.3 mechanical degrees. Between the tooth surfaces 209 slots 211 are formed, which extend tangentially over 86 electrical degrees.

All the embodiments disclosed herein can be manufactured at low cost, have a long lifetime and combine a high efficiency with a highly constant speed of rotation.

Although three-phase embodiments comprising a certain number of stator teeth and rotor poles are shown, the invention is not limited to the disclosed numbers. Other combinations of teeth and poles, the ratio between the number of poles and the number of teeth being either 4:3 or 2:3 are also possible, the ratio between the number of poles and the number of teeth being either 4:3 or 2:3. Moreover, it is to be noted that within the scope of the invention it is possible to arrange the teeth on the rotor and the poles on the stator.

We claim:

1. A three-phase electrical machine, comprising:
a first machine section comprising an annular permanent-magnet body having a plurality of adjacent pole pairs, each comprising a north pole and a south pole;
a second machine section comprising a soft-magnetic body and at least one coil, slots formed in said body to define teeth, which each have a tooth surface for cooperation with said poles via an air gap, the tooth surfaces having equal tangential dimensions, each of the slots extending over at least 80 electrical degrees and at the most 90 electrical degrees in a tangential direction, and the number of poles and the number of teeth being in a ratio of 4:3 to each other; and
a machine shaft about which one machine section is rotatable relative to the other machine section.

2. A three-phase electrical machine, comprising:
a first machine section comprising an annular permanent-magnet body having a plurality of adjacent pole pairs, each comprising a north pole and a south pole;
a second machine section comprising a soft-magnetic body and at least one coil, slots formed in said body to define teeth, which each have a tooth surface for cooperation with said poles via an air gap, the tooth surfaces having equal tangential dimensions, each of the slots extending over at least 130 electrical degrees and at the most 150 electrical degrees in a tangential direction, and the number of poles and the number of teeth being in a ratio of 4:3 to each other; and
a machine shaft about which one machine section is rotatable relative to the other machine section.

3. A three-phase electrical machine, comprising:
a first machine section comprising an annular permanent-magnet body having a plurality of adjacent pole pairs, each comprising a north pole and a south pole;
a second machine section comprising a soft-magnetic body and at least one coil, in which body slots extending over at least 80 electrical degrees and at the most 90 electrical degrees in a tangential direction near an air gap are formed to define teeth, which each have a tooth surface for cooperation with said poles via an air gap, the tooth surfaces having equal tangential dimensions, and the number of poles and the number of teeth being in a ratio of 2:3 to each other; and
a machine shaft about which one machine section is rotatable relative to the other section.

4. A three-phase electrical machine, comprising:
a first machine section comprising an annular permanent-magnet body having a plurality of adjacent pole pairs, each comprising a north pole and a south pole;
a second machine section comprising a soft-magnetic body and at least one coil, slots formed in said body to define teeth, which each have a tooth surface for cooperation with said poles via an air gap, the number of poles and the number of teeth is in a ratio of 2:3 to each other, the tooth surfaces having equal tangential dimensions, and the slots near the air gap extending over at least 130 electrical degrees and at the most 150 electrical degrees in a tangential direction, and
a machine shaft about which one machine section is rotatable relative to the other machine section.

5. An electrical machine as claimed in claim 1 or 3, characterized in that near the air gap the slots extend over at least 86 electrical degrees and at the most 90 electrical degrees in a tangential direction.

6. An electrical machine as claimed in claim 2, or 4 characterized in that near the air gap the slots extend over at least 143 electrical degrees and at the most 147 electrical degrees in a tangential direction.

* * * * *